United States Patent
Edwards et al.

(10) Patent No.: US 8,645,949 B2
(45) Date of Patent: Feb. 4, 2014

(54) SYSTEM, METHOD, AND COMPUTER PROGRAM PRODUCT FOR SCANNING DATA UTILIZING ONE OF A PLURALITY OF VIRTUAL MACHINES OF A DEVICE

(75) Inventors: Jonathan L. Edwards, Portland, OR (US); John D. Teddy, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 1356 days.

(21) Appl. No.: 12/132,113

(22) Filed: Jun. 3, 2008

(65) Prior Publication Data
US 2013/0275964 A1  Oct. 17, 2013

(51) Int. Cl.
*G06F 9/455* (2006.01)
*G06F 11/00* (2006.01)

(52) U.S. Cl.
USPC .......... 718/1; 726/22; 726/23; 726/24; 726/25

(58) Field of Classification Search
USPC ................. 718/1, 100, 102, 104; 726/22–25
See application file for complete search history.

(56) References Cited

U.S. PATENT DOCUMENTS

| | | | |
|---|---|---|---|
| 7,096,501 B2* | 8/2006 | Kouznetsov et al. | 726/24 |
| 2005/0216759 A1* | 9/2005 | Rothman et al. | 713/200 |
| 2006/0075502 A1* | 4/2006 | Edwards | 726/24 |
| 2009/0089879 A1* | 4/2009 | Wang et al. | 726/24 |
| 2009/0158432 A1* | 6/2009 | Zheng et al. | 726/24 |
| 2009/0241194 A1* | 9/2009 | Thomas | 726/24 |
| 2010/0138924 A1* | 6/2010 | Heim et al. | 726/24 |

* cited by examiner

*Primary Examiner* — Emerson Puente
*Assistant Examiner* — Willy W Huaracha
(74) *Attorney, Agent, or Firm* — Wong, Cabello, Lutsch, Rutherford & Brucculeri, LLP (57) ABSTRACT

A system, method, and computer program product are provided for scanning data utilizing one of a plurality of virtual machines of a device. In use, data to be scanned is identified utilizing a first virtual machine of a device, where the device further includes at least one second virtual machine and a cache shared by the first virtual machine and the second virtual machine. Additionally, it is determined whether the data was previously scanned by the at least one second virtual machine, utilizing the cache. Furthermore, the data is conditionally scanned utilizing the first virtual machine based on the determination.

20 Claims, 5 Drawing Sheets

SYSTEM, METHOD, AND COMPUTER PROGRAM PRODUCT FOR SCANNING DATA UTILIZING ONE OF A PLURALITY OF VIRTUAL MACHINES OF A DEVICE

FIELD OF THE INVENTION

The present invention relates to scanning data, and more particularly to scanning data utilizing a virtual machine.

BACKGROUND

Traditionally, data has been scanned for determining whether such data is unwanted (e.g. malware, etc.). Oftentimes, virtual machines are utilized for scanning data, such that, for example, the data may be scanned within a protected virtual environment. However, traditional techniques for scanning data utilizing virtual machines have exhibited various limitations. Just by way of example, multiple virtual machines employed by a single system have conventionally operated independently, thus resulting in redundant scanning of data via such virtual machines.

There is thus a need for addressing these and/or other issues associated with the prior art.

SUMMARY

A system, method, and computer program product are provided for scanning data utilizing one of a plurality of virtual machines of a device. In use, data to be scanned is identified utilizing a first virtual machine of a device, where the device further includes at least one second virtual machine and a cache shared by the first virtual machine and the second virtual machine. Additionally, it is determined whether the data was previously scanned by the at least one second virtual machine, utilizing the cache. Furthermore, the data is conditionally scanned utilizing the first virtual machine based on the determination.

DETAILED DESCRIPTION

Figure 1:
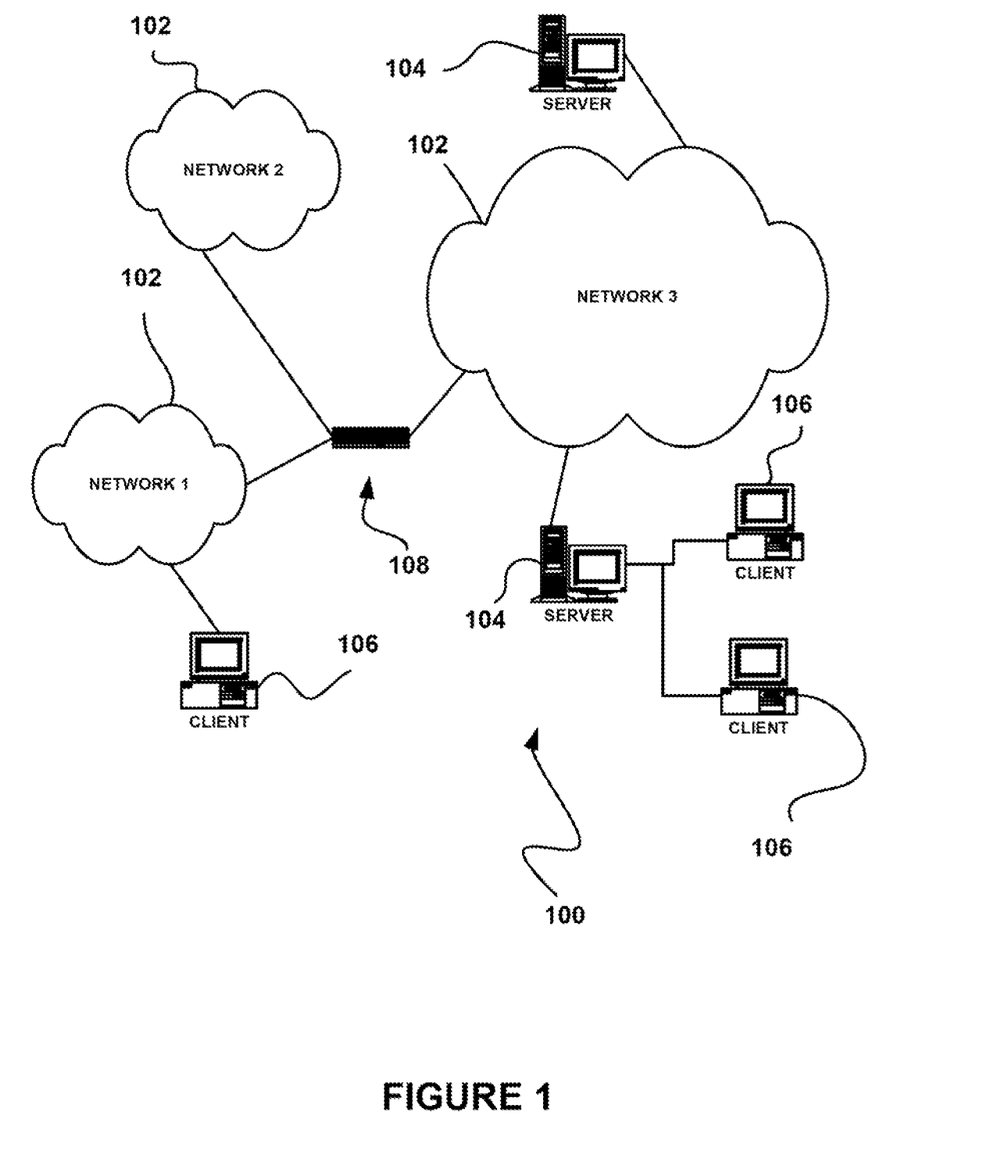
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any farm including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
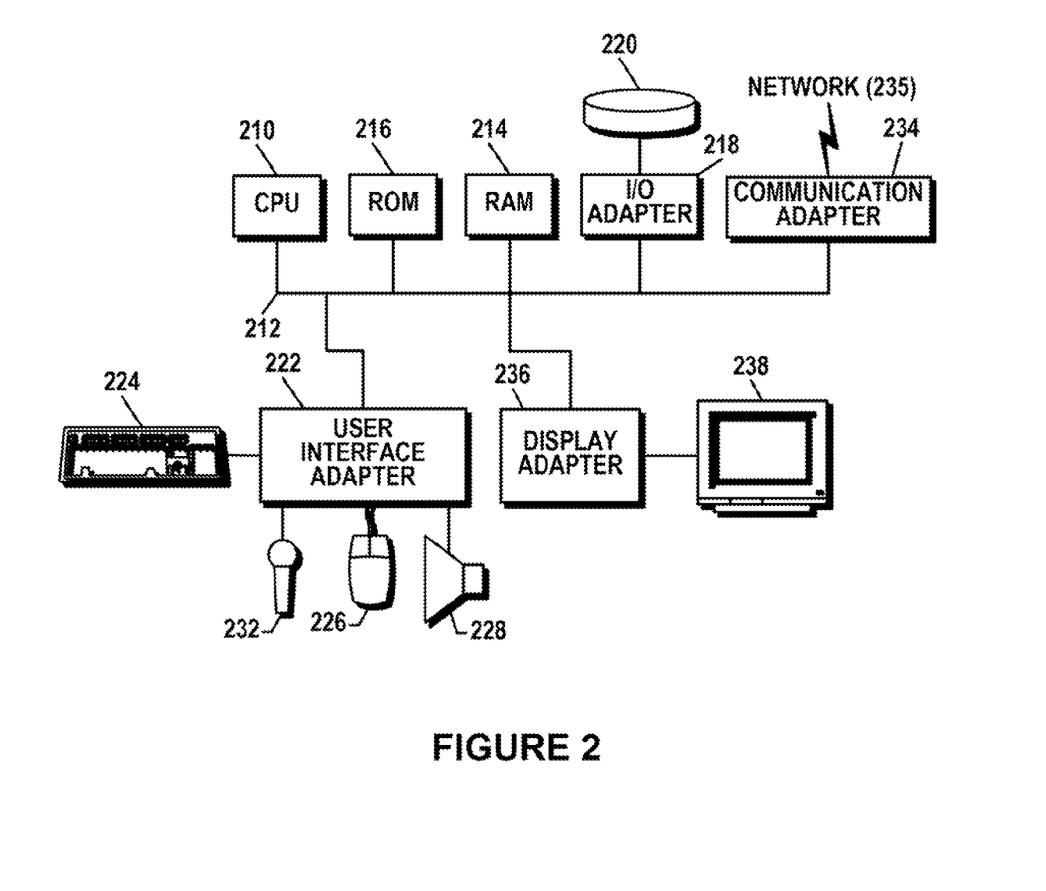
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written, using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any-type of logic may be utilized which is capable of implementing the various functionality set forth herein.

Figure 3:
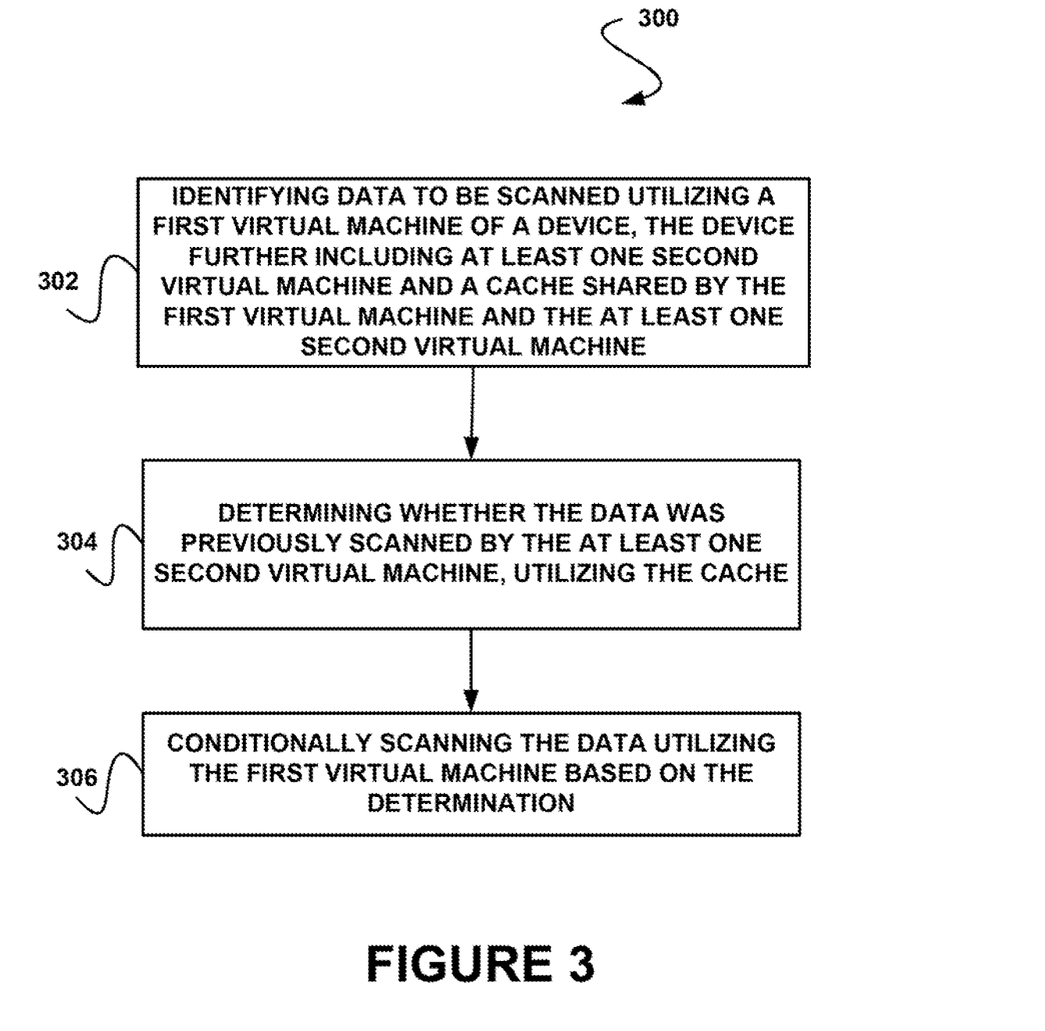
FIG. 3 shows a method for scanning data utilizing one of a plurality of virtual machines of a device, in accordance with one embodiment.

FIG. 3 shows a method 300 for scanning data utilizing one of a plurality of virtual machines of a device, in accordance with one embodiment. As an option, the method 300 may be carried out in the context of the architecture and environment of FIGS. 1 and/or 2. Of course, however, the method 300 may be carried out in any desired environment.

As shown in operation 302, data to be scanned is identified, utilizing a first virtual machine of a device, where the device further includes at least one second virtual machine and a cache shared by the first virtual machine and the at least one second virtual machine. In the context of the present description, the device may include any type of device capable of including (e.g. executing, etc.) multiple virtual machines. For example, the device may include a physical computer, such as any of the devices described above with respect to FIGS. 1 and/or 2.

Also in the context of the present description, the first virtual machine and the second virtual machine may each include any virtual implementation of a machine capable of being utilized to scan the data. Just by way of example, the first virtual machine and the second virtual machine may each include a software implementation of a physical computer, etc. in various embodiments, the first virtual machine and/or the second virtual machine may each include a guest virtual machine (e.g. a virtual machine running its own operating system), a security virtual machine (e.g. a virtual machine utilized for monitoring security, a virtual machine utilized for monitoring parameters of other virtual machines, etc.), a uniquely configured virtual machine, a general purpose virtual machine and/or any other desired type of virtual machine.

Still yet, the cache of the device that is shared by the first virtual machine and the second virtual machine may include any data structure shared by the first virtual machine and the second virtual machine that is capable of being utilized to determine whether the data was previously scanned. In one embodiment, the cache may store an identifier (e.g. a file name, a hash, etc.) of previously scanned data. Such previously scanned data may include any data scanned by one of the first virtual machine and the second virtual machine of the device.

In another embodiment, the cache may store a security status of the previously scanned data. As an option, the security status may indicate whether the data is unwanted (e.g. malware, etc.). As another option, the security status may indicate whether the data is wanted (e.g. clean of unwanted data, etc.).

In yet another embodiment, the cache may be located in any portion of memory of the device capable of being shared by the first virtual machine and the second virtual machine. For example, the cache may be located cm the device (e.g. in the first virtual machine or the second virtual machine). In this way, the cache may be located on a security virtual machine, a general purpose virtual machine, etc.

Further, the data to be scanned may include any data capable of being scanned (e.g. for unwanted data, etc.). For example, the data may include a file, an application, a folder, etc. Such data may optionally be stored (e.g. replicated) in each of the first virtual machine and the second virtual machine.

As another option, the data may be stored in memory shared by the first virtual machine and the second virtual machine. The memory in which the data is stored may be located locally with respect to the device or may be remotely stored with respect to the device (e.g. in a network attached storage device, etc.). Accordingly, the data may be accessible by the first virtual machine and the second virtual machine, in one embodiment.

In one embodiment, the data to be scanned may be identified utilizing the first virtual machine based on (e.g. in response to, etc.) a request to access the data. Thus, the data to be scanned may optionally be identified in response to a request to initiate an on-access scan of the data. Of course, however, the data to be scanned may be identified in any desired manner.

Additionally, as shown in operation 304, it is determined whether the data was previously scanned by the second virtual machine, utilizing the cache. In one embodiment, determining whether the data was previously scanned by the second virtual machine may include determining whether the data was previously scanned by any virtual machine of the device other than the first virtual machine. Such previous scan may include any scan of the data performed prior to the identification of the data to be scanned (in operation 302). In this way, it may be determined whether scanning the data by the first virtual machine would be redundant to a previous scan of the data by the second virtual machine.

Moreover, it may be determined whether the data was previously scanned by the second virtual machine in any manner that utilizes the cache shared by the first virtual machine and die second virtual machine. In one embodiment, the determination may include determining whether an identifier of the data is included in the cache. For example, the identifier of the data may be ascertained (e.g. by hashing the data, etc.) and compared to information (e.g. identifiers) stored in the cache. Thus, in an embodiment where the cache stores identifiers of previously scanned data, it may be determined that the data has been previously scanned by the second virtual machine if it is determined that the identifier of the data is included in the cache.

Further still, the data is conditionally scanned utilizing the first virtual machine based on the determination, as shown in operation 306. In one embodiment, the data may be scanned utilizing the first virtual machine if it is determined that the data was not previously scanned by the second virtual machine. Scanning the data may include comparing the data to signatures of known unwanted data for determining whether the data is unwanted, performing a heuristics analysis with respect to the data and/or determining in any other manner whether the data includes unwanted data.

As an option, in response to a scan of the data by the first virtual machine, the cache may be updated to indicate such scan. For example, an identifier of the data may be stored in the cache. As another example, a result of the scan of the data (e.g. indicating whether the data includes unwanted data, etc.) may be stored in the cache in association with the identifier of the data.

In another embodiment, the data may be prevented from being scanned by the first virtual machine if it is determined that the data was previously scanned by the second virtual machine. Just by way of example, the request to initiate the cm-access scan via which the data to be scanned may be identified (in operation 302) may be denied. Accordingly, repeated scans of the data by different virtual machines of the device may be avoided. As an option, if the data is prevented from being scanned by the first virtual machine, utilizing the cache, a result of a previous scan of the data stored in the cache may be returned to the first virtual machine (e.g. in response to the request to initiate the on-access scan, etc.).

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
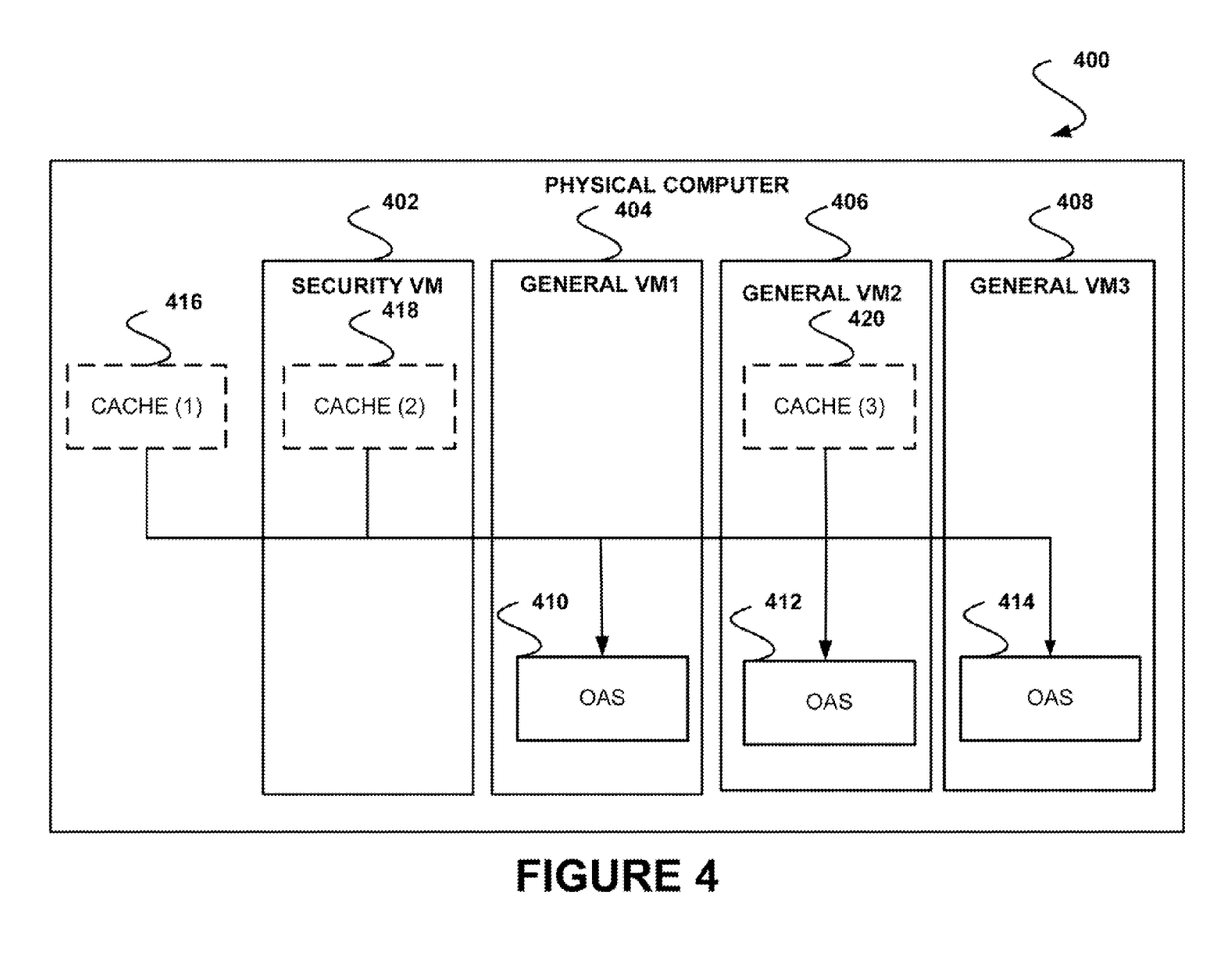
FIG. 4 shows a system for scanning data utilizing one of a plurality of virtual machines of a device, in accordance with another embodiment.

FIG. 4 shows a system 400 for scanning data utilizing one of a plurality of virtual machines of a device, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, in the context of the present embodiment, the system 400 may include a physical computer. For example, the system 400 may include a client and/or server computer. While a physical computer is described herein, it should be noted that the system 400 may include any device on which a plurality of virtual machines 402-408 may be located.

Additionally, the virtual machines of the system 400 may include a security virtual machine 402 and multiple general virtual machines 404-408. Of course, however, the virtual machines of the system 400 may include any desired type of virtual machines.

Further, a plurality of on-access scanners 410-414 may be located on various virtual machines 402-408 of the system 400. As shown, the on-access scanners 410-414 may be located on the general virtual machines 404-408, but of course may also be located on any other virtual machines 402-408 of the system 400. With respect to the present embodiment, the on-access scanners 410-414 may each be utilized for scanning data in response to a request (e.g. generated by a user, generated by an application, etc.) to access such data. It should also be noted that while the on-access scanners 410-414 are shown, any desired type of scanner (e.g. on-demand scanner, etc.) may be located on any of the virtual machines 402-408 of the system 400.

Still yet, the system 400 includes a cache 416-420. In one embodiment, the cache 416 may be located outside of the virtual machines 402-408 of the system 400. In another embodiment, the cache 418 may be located on the security virtual machine 402.

In yet another embodiment, the cache 420 may be located on one of the general virtual machines 420. In yet another embodiment, the cache 416-420 may be located in one of the virtual machines 402-408 selected based cm predetermined criteria. Just by way of example, the virtual machine 402-408 on which the cache 416-420 is located may be selected based on the virtual machine 402-408 being the first virtual machine 402-408 of the system 400 to boot (e.g. power up, etc.).

Of course, however, the cache 416-420 may be located in any location capable of being accessed [e.g. via an application program interface (API), etc.] by each of the virtual, machines 402-408 of the system 400. As an option, the cache 416-420 may be moved from being located in one of the 402-408 to another one of the virtual machines 402-408. For example, the cache 416-420 may be moved periodically, in response to a determination that a virtual machine 402-408 in which the cache 416-420 is located is inaccessible by the other virtual machines 402-408 of the system 400 (e.g. that the cache 416-420 is located in an inoperable virtual machine 402-408), etc.

To this end, data to be scanned utilizing a first one of the virtual machines 402-408 may be identified by such first one of the virtual machines 402-408 in response to initiation of an on-access scan by an on-access scanner 410-414 of the first one of the virtual machines 402-408. In one embodiment, the data to be scanned may be stored in the first one of the virtual machines 402-408. In another embodiment, the data to be scanned may be stored in memory shared by the virtual machines 402-408 of the system 400.

In response to identification of the data to be scanned, the first one of the virtual machines 402-408 may access the cache 416-420. For example, the first one of the virtual machines 402-408 may utilize the cache 416-420 to determine whether the data to be scanned has previously been scanned by a second one of the virtual machines 402-408. In one embodiment, the first one of the virtual machines 402-408 may query the cache 416-420 to determine whether the data to be scanned has previously been scanned by a second one of the virtual machines 402-408.

As an option, the first one of the virtual machines 402-408 may query the cache 416-420 utilizing an identifier (e.g. file name, hash, etc.) of the data to be scanned. The identifier of the data to be scanned may be compared with identifiers stored in the cache 416-420. Thus, if the identifier of the data to be scanned matches one of the identifiers stored in the cache 416-420, it may be determined that the data to be scanned has previously been scanned by a second one of the virtual machines 402-408.

Accordingly, a response to such query from the cache 416-420 may optionally indicate whether the data to be scanned has previously been scanned by a second one of the virtual machines 402-408. As another option, if the response indicates that the data to be scanned has previously been scanned by a second one of the virtual machines 402-408, the response may also indicate a result of such previous scan of the data. For example, the response may indicate whether the unwanted data was detected in the data by the previous scan of the data.

If the first one of the virtual machines 402-408 determines that the data to be scanned has been previously scanned, based on the response received from the cache 416-420, the first one of the virtual machines 402-408 may prevent performance of the on-access scan of the data. Furthermore, the first one of the virtual machines 402-408 may optionally react to the request to access the data that initiated the on-access scan, based on the result of the previous scan of the data indicated by the response from the cache 416-420.

The reaction may include preventing the access to the data, for example, if the response indicates that the data includes unwanted data. As another option, the reaction may include allowing the access to the data if the response indicates that the data does not include unwanted data. Of course, however, the reaction may include any desired action capable of being performed with respect to the data.

If the first one of the virtual machines 402-408 determines that the data to be scanned has not been previously scanned, based on the response received from the cache 416-420, the first one of the virtual machines 402-408 may perform the on-access scan of the data. In this way, the first one of the virtual machines 402-408 may determine whether the data includes unwanted data, based on the performance of the on-access scan. Furthermore, the first one of the virtual machines 402-408 may optionally react to the request to access the data that initiated the on-access scan, based on a result of the on-access scan.

The reaction may include preventing the access to the data, for example, if the result of the on-access scan indicates that the data includes unwanted data. As another option, the reaction may include allowing the access to the data if the result of the on-access scan indicates that the data does not include unwanted data. Of course, however, the reaction may include any desired action capable of being performed with respect to the data.

Figure 5:
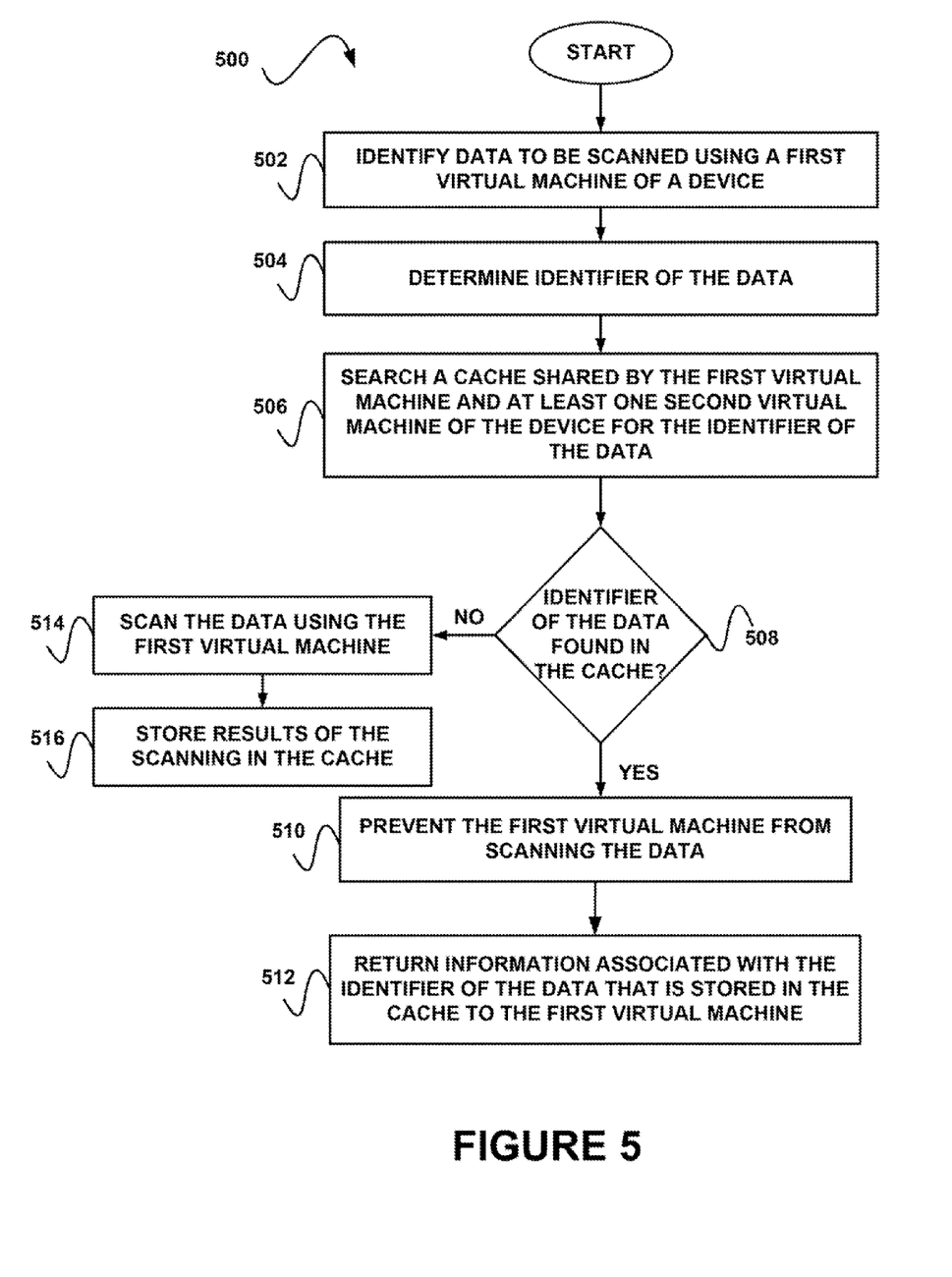
FIG. 5 shows a method for scanning data utilizing one of a plurality of virtual machines of a device based on a determination of whether an identifier of the data is stored in a cache shared by the virtual machines, in accordance with yet another embodiment.

FIG. 5 shows a method 500 for scanning data utilizing one of a plurality of virtual machines of a device based on a determination of whether an identifier of the data is stored in a cache shared by the virtual machines, in accordance with yet another embodiment. As an option, the method 500 may be carried out in the context of the architecture and environment of FIGS. 1-4. For example, the method 500 may be carried out utilizing the system 400 of FIG. 4. Of course, however, the method 500 may be carried out in arty desired environment. Again, it should be noted that the aforementioned definitions may apply during the present description.

As shown in operation 502, data to be scanned is identified using a first virtual machine of a device. The data to be scanned may include any data to be scanned utilizing the first virtual machine, with respect to the present embodiment. As an option, the data to be scanned may be identified in response to detection of a request to access the data by the first virtual machine (e.g. by monitoring for such a request via the first virtual machine, etc.).

In addition, an identifier of the data is determined, as shown in operation 504. In one embodiment, the identifier of the data may include a file name of the data. As an option, the identifier may include the file name if the data is stored on a read-only disk of the device that is shared by the first virtual machine and any other virtual machine of the device. For example, it may be ensured that file name uniquely identifies the data if the data is shared by the virtual machines of the device via the read-only disk of the device.

In another embodiment, the identifier of the data may include a hash of the data. The identifier may optionally include the hash if the data is stored on a network attached storage device and/or a disk of the device that is capable of being modified (e.g. written to, etc.). As another option, the hash may be of only a portion of the data or all of the data. Of course, it should be noted that the identifier of the data may include any unique information (e.g. value, string, etc.) capable of identifying the data.

Furthermore, a cache shared by the first virtual machine and at least one second virtual machine of the device is searched for the identifier of the data. Note operation 506. Just by way of example, the cache may be queried for the identifier of the data. With respect to the present embodiment, the cache my store identifiers of data previously scanned by one of the virtual machines of the device.

As shown in decision 508, it is determined whether the identifier of the data is found in the cache. In one embodiment, the determination may be made by the first virtual machine of the device. For example, the determination may be made based on a response to the query that is received by the cache.

If it is determined that the identifier of the data is found in the cache, the first virtual machine is prevented from scanning the data. Note operation 510. Just by way of example, the first virtual machine may terminate a scan of the data initiated by a request to access the data. Of course, however, the first virtual machine may be prevented from scanning the data in any desired manner.

Moreover, information associated with the identifier of the data that is stored in the cache is returned to the first virtual machine, as shown in operation 512. The information may include any information stored in the cache in association with the identifier of the data. For example, the information may include a result of the previous scan of the data, such as whether the previous scan determined that tire data includes unwanted data.

If, however, it is determined that the identifier of the data is not found in the cache, the data is scanned utilizing the first virtual machine, as shown in operation 514. For example, the data may be scanned for unwanted data. Furthermore, results of the scanning are stored in the cache, as shown in operation 516. The results may indicate whether the data includes unwanted data, for example.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising instructions stored thereon to cause a processor to:
   identify data to be scanned with a type of scan at a local scanner of a first virtual machine of a device, wherein the device comprises a plurality of virtual machines, each virtual machine comprising a local scanner, the local scanner having access to a cache shared by the plurality of virtual machines;
   determine, at the first virtual machine, an identifier of the data;
   determine, at the first virtual machine, whether the identifier is stored in the cache, wherein presence of the identifier in the cache indicates that the data has been previously scanned by a local scanner of one of the plurality of virtual machines;
   receive a security status at the first virtual machine after it is determined that the identifier is stored in the cache, the security status associated with the identifier of the data, wherein the security status comprises a result of a previous scan of the data and the security status comprises information about the type of scan that was performed;
   forgo scanning of the data at the local scanner of the first virtual machine when the security status is determined to comprise a result not indicating unwanted data; and
   scan the data and store the identifier and the security status in the cache utilizing the local scanner of the first virtual machine when it is determined that the identifier is not stored in the cache or when the result indicates unwanted data.

2. The computer program product of claim 1, wherein the instructions to cause the processor to identify the data to be scanned comprise instructions to cause the processor to identify the data based on a request to access the data.

3. The computer program product of claim 1, wherein the cache is located in a security virtual machine of the plurality of virtual machines.

4. The computer program product of claim 3, wherein the security virtual machine is utilized for at least one of monitoring security and monitoring parameters of other virtual machines.

5. The computer program product of claim 1, wherein the cache is located on one of the plurality of virtual machines.

6. The computer program product of claim 5, wherein the cache may be moved to another of the plurality of virtual machines in response to a determination that any of the plurality of virtual machines do not have access to the cache.

7. The computer program product of claim 1, wherein the identifier includes a file name of the data.

8. The computer program product of claim 1, wherein the identifier includes a hash of the data.

9. The computer program product of claim 1, wherein two or more replicated copies of the data are located on two different virtual machines of the plurality of virtual machines.

10. The computer program product of claim 1, wherein the security status further comprises information about the virtual machine that performed the previous scan.

11. A method, comprising:
   identifying data to be scanned with a type of scan at a local scanner of a first virtual machine of a device, wherein the device comprises a plurality of virtual machines, each virtual machine comprising a local scanner, the local scanner having access to a cache shared by the plurality of virtual machines;
   determining, at the first virtual machine, an identifier of the data;
   determining, at the first virtual machine, whether the identifier is stored in the cache, wherein presence of the identifier in the cache indicates that the data has been previously scanned by a local scanner of one of the plurality of virtual machines;
   receiving a security status at the first virtual machine after it is determined that the identifier is stored in the cache, the security status associated with the identifier of the data, wherein the security status comprises a result of a previous scan of the data and the security status comprises information about the type of scan that was performed;

preventing the data from being scanned at the local scanner of the first virtual machine the security status is determined to comprise a result not indicating unwanted data; and scanning the data and storing the identifier and the security status in the cache utilizing the local scanner of the first virtual machine when it is determined that the identifier is not stored in the cache or when the result indicates unwanted data.

12. The method of claim 11, wherein the act of identifying the data to be scanned comprises identifying a request to access the data.

13. The method of claim 11, wherein the identifier includes a file name of the data.

14. The method of claim 11, wherein the identifier includes a hash of the data.

15. The method of claim 11, wherein the cache stores a result of a previous scan of the data in association with the identifier of the data.

16. The method of claim 11, wherein the acts of scanning the data and storing the identifier in the cache further comprises storing a result of the scan of the data by the local scanner of the first virtual machine in association with the identifier in the cache.

17. The method of claim 11, wherein the data is stored in memory shared by the first virtual machine and at least one other virtual machine of the plurality of virtual machines.

18. The method of claim 11, wherein the cache is located on one of the plurality of virtual machines, and wherein the cache may be moved to another of the plurality of virtual machines in response to a determination that any of the plurality of virtual machines do not have access to the cache.

19. A system, comprising:
a memory; and
a processor operatively coupled to the memory, the processor adapted to:
identify data to be scanned with a type of scan at a local scanner of a first virtual machine of the system, wherein the system comprises a plurality of virtual machines, each virtual machine comprising a local scanner, the local scanner having access to a cache shared by the plurality of virtual machines;

determine, at the first virtual machine, an identifier of the data;

determine, at the first virtual machine, whether the identifier is stored in the cache, wherein presence of the identifier in the cache indicates that the data has been previously scanned by a local scanner of one of the plurality of virtual machines;

receive a security status at the first virtual machine after it is determined that the identifier is stored in the cache, the security status associated with the identifier of the data, wherein the security status comprises a result of a previous scan of the data and the security status comprises information about the type of scan that was performed;

forgo scanning of the data at the local scanner of the first virtual machine when the security status is determined to comprise a result not indicating unwanted data; and scan the data and store the identifier and the security status in the cache utilizing the first scanner of the first virtual machine when it is determined that the identifier is not stored in the cache or when the result indicates unwanted data.

20. The system of claim 19, wherein the cache is located on one of the plurality of virtual machines, and wherein the cache may be moved to another of the plurality of virtual machines in response to a determination that any of the plurality of virtual machines do not have access to the cache.

* * * * *